Jan. 21, 1964 J. E. MEKOTA, JR 3,119,094

CHECK NUMBER GENERATING CIRCUITS FOR INFORMATION HANDLING APPARATUS

Filed Dec. 26, 1958 2 Sheets-Sheet 1

INVENTOR.
JOHN E. MEKOTA, JR.
BY Henry L. Hanson
ATTORNEY

INVENTOR.
JOHN E. MEKOTA, JR.
BY Henry L. Hanson
ATTORNEY

United States Patent Office 3,119,094

Patented Jan. 21, 1964

3,119,094

CHECK NUMBER GENERATING CIRCUITS FOR INFORMATION HANDLING APPARATUS

John E. Mekota, Jr., Belmont, Mass., assignor to Minneapolis-Honeywell Regulator Company, Minneapolis, Minn., a corporation of Delaware Filed Dec. 26, 1958, Ser. No. 783,014
11 Claims. (Cl. 340—146.1)

A general object of the present invention is to provide a new and improved apparatus for use in the handling of digital information and particularly the checking of the manipulation thereof. More specifically, the present invention is concerned with the new and improved method of generating checking data for a multiple channel data processing circuit which is characterized by the ability of the circuit to indicate an error condition in one circuit by way of checking information developed by way of two or more circuits.

Informational handling apparatus, such as digital data processors, are generally used for purposes of transferring and manipulating digital data in accordance with certain predetermined operations. The data used in such data processors is generally of the binary or binary coded form. In the binary form of notation, data may conveniently be represented in terms of electrical pulses, the presence or absence of which may be arranged in a predetermined positional or time sequence to uniquely identify characters and numerals. In transferring and manipulating digital data, apparatus malfunctioning may cause electrical pulses to be transposed in their relative positions, eliminated from a desired position, or generated where no pulses were intended, the net effect of which will be an error. In order that such digital data processing apparatus may be useful, it is essential that there be provided means for checking or detecting the presence of errors so that steps may be taken to correct the error, either manually or automatically.

In a patent issued to R. M. Bloch, Reissue 24,447, dated March 25, 1958, there is disclosed a diagnostic information monitoring system. This monitoring system is one which generates a number from the data being monitored, either in the form of a single bit or a number of bits, which number is referred to as a weight count, or check number. This weight count or check number is transferred with the information as it is handled in a data processing apparatus. In its more powerful form, when a plurality of bits are used in a checking number, it is possible to generate a check number which is capable of detecting all types of single errors and most multiple errors normally encountered. In such a scheme, the information may be divided into information groups of substantially uniform length where each electrical signal or bit in the group is weighted in accordance with the binary form of notation, namely, one, two, four, eight, and the like. The check number is, therefore, produced by summing the weights of the respective bits and then reducing the resultant sum by some modulus, such as modulo 9.

In certain types of apparatus, the weighted scheme disclosed in the Bloch patent will not yield a sufficiently high degree of checking accuracy as might be desired. With the advent of error correction schemes of the type disclosed in the copending Bloch application entitled "Information Handling Apparatus," bearing Serial Number 702,668, filed December 13, 1957, now issued as Patent Number 2,977,047, it is important that the power of checking and detecting errors be increased for the reason that unless an error is detected, there can be no automatic correction.

In accordance with the teachings of the present invention, data or information is adapted to be handled by way of a plurality of channels. The data manipulated on the channels may be by way of a serial or parallel transmission, the manner of manipulation being dependent upon the type of data processing system with which the present invention is used. Instead of utilizing the information in a single channel for purposes of generating a single check number, the present invention provides a check number for each channel which is actually constructed from the information in two or more channels. From this arrangement it is possible to determine from an indicated error in two or more check numbers which single channel contains an error.

It is therefore a further more specific object of the present invention to provide a new and improved checking apparatus for use with a data processor wherein checking data for information processed on the multiplicity of channels is uniquely generated for each channel in accordance with information residing in two or more channels and in such a manner that the nature of the observed error indication will identify any single channel in error.

The principles of the present invention may be extended further by arranging the data in a single channel so that when it is examined in one circuit, the weight thereof will be of a first value, while when it is examined in a second circuit, the weight thereof will be of a second value. The weighting scheme may be chosen so that any two bits of information will not have the same weight in more than one generator unless they are separated by a large number of information bits. One method of accomplishing this is to choose a weighting scheme which has different periods of repetition where the periods are relatively prime with respect to each other. With this arrangement, two bits of information will not have the same weight count unless they are uniquely spaced a predetermined distance apart depending upon the periods of repetition selected.

Another object of the invention is therefore to provide a new and improved apparatus for generating check numbers for a data transfer circuit having a plurality of channels where the channels have the bits thereof uniquely weighted in accordance with two separate weighting schemes having different periods of repetition.

Another object of the invention is to provide a new and improved checking number generating circuit, in accordance with the foregoing object, wherein the weighting schemes are selected to have different periods of repetition which are relatively prime with respect to each other.

Another object of the invention is to provide a new and improved checking number generating circuit, in accordance with the foregoing objects, wherein the weighting schemes are selected to make possible detection of all errors occurring within a set of $k$ successive bits, unless more than $e$ bits are in error.

Another object of the invention is to provide a new and improved checking number generating circuit, in accordance with the foregoing objects, wherein the weighting schemes are selected to make possible detection of all combinations of errors, with an odd number of bits in error in a channel.

Another object of the invention is to provide a new and improved checking number generating circuit, in accordance with the foregoing objects, wherein the weights are selected to guarantee detection of all errors in which less than $f$ bits are in error in a channel, where $f$ is a function of the number of check bits per channel, and the number of channels of check data in which each channel participates.

Another object of the invention is to provide a means of identifying, with high probability, which specific $q$ channels out of $n$ transmitted erroneous information where $kq<p$, and $p$ is a preassigned number $<n$.

In addition to weighting the information from this selective channel in two or more ways, it is also possible to uniquely arrange the accumulators for the generated weights so that the accumulator relating to any particular channel is operating with a different radix or modulus than that associated with any other channel.

It is also possible to uniquely arrange the accumulators for the generated weights so that carry is permitted between successive columns, between certain pairs of columns only, between certain groups of columns not successive, or between no columns.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
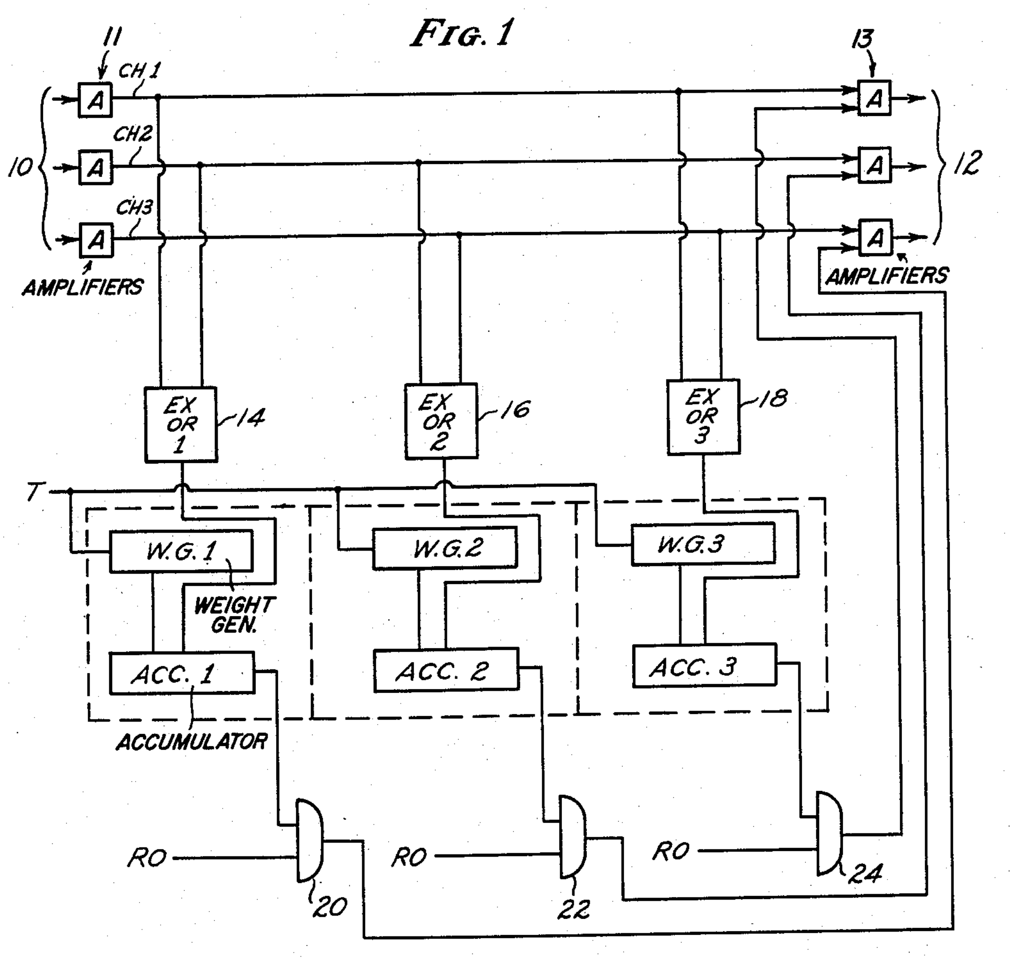
FIGURE 1 is a diagrammatic representation of one form of the present invention.

Referring first to FIGURE 1, there is here represented a three-channel data transfer circuit which is adapted to transfer data from an input 10, which includes a plurality of input transfer amplifiers 11, to an output 12, which includes a plurality of output transfer amplifiers 13. The three channels are represented by the identification CH1, CH2, and CH3. The data transferred on these three channels is preferably considered as being transfered in the parallel mode. In other words, the data is such that electrical pulses in each channel will be in time synchronization in what may be identified as a frame.

In accordance with the principles of the invention, it is desired to generate from the information passing in each frame on the channels CH1, CH2, and CH3 check numbers which may subsequently be examined to determine if the data has been transferred and/or manipulated without error. As pointed out above, the numbers generated for checking the data are generated from more than one channel. Thus, there is connected to channels CH1 and CH2 an exclusive OR circuit 14. Connected to the channels CH2 and CH3 is an exclusive OR circuit 16. Connected to channels CH1 and CH3 is an exclusive OR circuit 18.

The exclusive OR circuit 14 is connected to control the gating of a signal from a weight generator WG1, into an accumulator ACC1. Exclusive OR circuit 16 is connected to control the gating of a signal from a weight generator WG2 into an accumulator ACC2. The exclusive OR circuit 18 is connected to control the gating of a signal from a weight generator WG3 into an accumulator ACC3. Each of the weight generators WG1, WG2, and WG3 have as an input a timing pulse T which is adapted to be synchronized with the incoming information pulses or frames transferred on the channels CH1, CH2, and CH3. The weight generators may be code generators built in the manner outlined in Chapter 6 of the R. K. Richards' book entitled "Arithmetic Operations in Digital Computers," D. Van Nostrand, 1955. Such code generators in construction may be either binary, decimal, or combined binary-decimal counters where the counter logic is selected to produce the output code desired. Binary counters are shown in the above-mentioned book by Richards, noting in particular FIGURES 7–1, 7–2 and 7–3 on pages 194 and 195. Such counters, if utilized herein in the form shown in the book, would take the form of recycling counters which have as inputs the timing signal T.

The accumulator may well be of the type outlined in Chapter 4 of the aforesaid Richards book. More specifically, representative binary accumulators will be found in FIGURES 4–13 and 4–14 in the Richards book on pages 101 and 103 respectively. The input to such an accumulator may preferably be by way of a parallel data transfer from the code generator or counter stages mentioned above. The code generator will function as the addend register each time an input bit is received from the input exclusive OR circuit. The generated numbers which are accumulated in the accumulators ACC1 through ACC3 are adapted to be read out and transferred to the channels CH1 through CH3 by way of a series of readout gates 20, 22, and 24. The readout is controlled by a signal R0 which is also applied to these gates.

Figure 2:
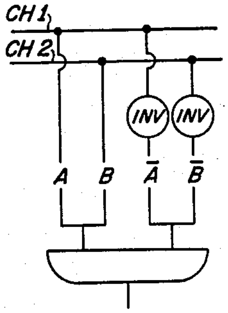
FIGURE 2 is a logical diagrammatic representation of a representative exclusive OR circuit usable with the circuitry of FIGURE 1.

Before considering the operation of FIGURE 1, reference is made to FIGURE 2 wherein logic for an exclusive OR circuit is illustrated. In FIGURE 2, the exclusive OR gating circuit will be seen to have four input signals. Four input signals are representative of the assertion and negation of data on two channels, A and B. The assertions are indicated by A and B, while the negations are indicated as $\overline{A}$ and $\overline{B}$. The negation of A and B may be provided by suitable signal inverters INV which are connected to the A and B inputs from channels CH1 and CH2 respectively. The exclusive OR gate is adapted to operate only when the signals in the two channels are not alike. Thus, if signal A is present and $\overline{B}$ is present, there will be an output signal from the gate at the output, which gate is an AND gate. Similarly, if signal B and the signal $\overline{A}$ are present, there will also be an output from the gate. However, if both A and B are present, or both $\overline{A}$ and $\overline{B}$ are present, there will be no output from the output gate.

The exclusive OR circuits of FIGURE 1 may take the form illustrated in FIGURE 2. Thus, the signals on channels 1 and 2 will be used to supply the input signals to the exclusive OR circuit 14 so that if either one or the other has an assertion thereon, while the other has a negation, the exclusive OR circuit 14 will have an output.

Figure 5:
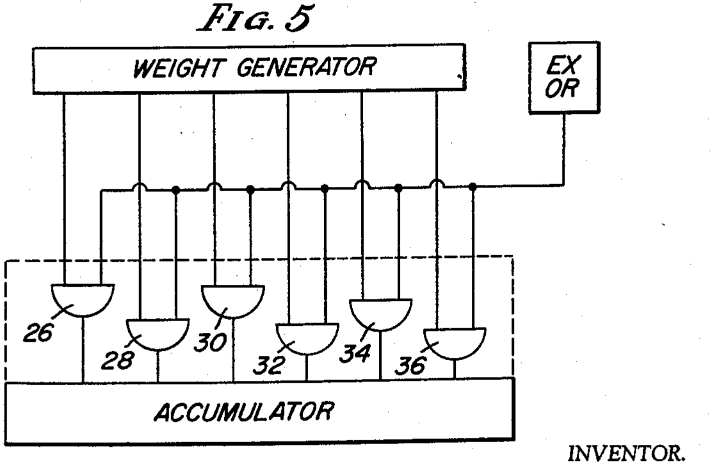
FIGURE 5 is a diagrammatic showing of circuit means for transferring data into an accumulator.

An output from one of the exclusive OR circuits may be associated with a weight generator and accumulator as shown in FIGURE 5. In this figure, the weight generator is assumed to have six parallel outputs having binary-type codes thereon as set forth below in any one of the Tables I, II and III. The accumulator is assumed to have six parallel inputs with each of these inputs being connected one each to a separate output of the weight generator by way of an AND gating circuit. The AND gating circuits 26, 28, 30, 32, 34 and 36 each have an input from the weight generator and a further input from the exclusive OR circuit so that when a signal appears on both of the inputs, a resultant output signal will be coupled into the associated accumulator by way of a parallel transister.

Each bit or frame position from the data transferred may be considered as having a unique weight assigned thereto by the weight generators WG1, WG2, and WG3. Preferably, the weights selected are different in each of the weight generators, and each of the weight generators WG1 through WG3 has a different period of repetition. If the periods of repetition of the weight generators are selected to be relatively prime, no two bits of information will have the same weight unless they are spaced, in the channel, by a number of frames or bits equivalent to the product of the periods of repetition in the generators associated with that particular channel. Noting FIGURE 1 more specifically, channel CH1 will have the bits therein contributing to the numbers accumulated in the accumulator ACC1 and ACC3. Thus, the weighting schemes of the generators WG1 and WG3 should be chosen to have different periods of repetition, N1 and N2, where N1 and N2 are relatively prime. Thus, the bits from channel 1 will not have the same weight unless the bits are spaced apart by the product of N1 times N2.

Considering further the exclusive OR circuit 14, with the inputs derived from channels CH1 and CH2, this exclusive OR circuit will be effective to cause a transfer of the contents of the weight generator 1 into the accumulator ACC1 each time there is an output signal. The timing signal T, which is related to the bit position or frame position of data being transferred on the channels, will increment or change the weight of the weight generator WG1 each time that a frame of data is transferred. The contents of the weight generator will then be transferred into the accumulator. The weight or number transferred will be determined by the bit position or frame position of the data transferred. The weights of the generator WG1 may be selected in accordance with the binary progression, namely, 1, 2, 4, 8, 16, and 32. If the period is selected to be 6, after the first six frames have been transferred, the weight generator will then repeat. Table I below shows a usable code for this generator.

*Table I*

WG1

1, 2, 4, 8, 16, 32 in
1, 2, 4, 8, 16, 32 code

| | |
|---|---|
| 000001 | $N_1=6$ |
| 000010 | |
| 000100 | |
| 001000 | |
| 010000 | |
| 100000 | |

The weight generator WG2 may be selected to have a different coding and a period of 31, which will be relatively prime with respect to the period 6 of the weight generator WG1. The code selected for weight generator WG2 may well be a six-bit code having the weights 1, 2, 3, 4, 5, and 16. The tabular form for such a code might well be, for the thirty-one positions, that listed in the following table.

*Table II*

WG2

1–31, in
1, 2, 3, 4, 5, 16 code

| | |
|---|---|
| 000001 | $N_2=31$ |
| 000010 | |
| 000100 | |
| 001000 | |
| 010000 | |
| 010001 | |
| 010010 | |
| 010100 | |
| 011000 | |
| 011001 | |
| 011010 | |
| 011100 | |
| 011101 | |
| 011110 | |
| 011111 | |
| 100000 | |
| 100001 | |
| 100010 | |
| 100100 | |
| 101000 | |
| 110000 | |
| 110001 | |
| 110010 | |
| 110100 | |
| 111000 | |
| 111001 | |
| 111010 | |
| 111100 | |
| 111101 | |
| 111110 | |
| 111111 | |

The weight generator WG3 may well be operating with a further code and the period thereof selected again to be relatively prime with respect to the other generator periods. If the period is selected to be 43, the code may well be 1, 2, 3, 4, 11, and 22. The tabular form for the respective weights generated are listed in the following Table III.

*Table III*

WG3

1–43, in
1, 2, 3, 4, 11, 22 code

| | |
|---|---|
| 000001 | $N_3=43$ |
| 000010 | |
| 000100 | |
| 001000 | |
| 001001 | |
| 001010 | |
| 001100 | |
| 001101 | |
| 001110 | |
| 001111 | |
| 010000 | |
| 010001 | |
| 010010 | |
| 010100 | |
| 011000 | |
| 011001 | |
| 011010 | |
| 011100 | |
| 011101 | |
| 011110 | |
| 011111 | |
| 100000 | |
| 100001 | |
| 100010 | |
| 100100 | |
| 101000 | |
| 101001 | |
| 101010 | |
| 101100 | |
| 101101 | |
| 101110 | |
| 101111 | |
| 110000 | |
| 110001 | |
| 110010 | |
| 110100 | |
| 111000 | |
| 111001 | |
| 111010 | |
| 111100 | |
| 111101 | |
| 111110 | |
| 111111 | |
| 000001 | |

etc.

Inasmuch as weight generator WG1 and weight generator WG3 are associated with channel 1, in order for the relative weights assignments given to the bits therefrom to be the same, the frames will have to be separated by the product of 6 and 43, or 258 frames. Normally, data transferred will be transferred in units of information less than 258 frames, so that the resultant weight assignments for a bit in a frame are never repeated within any particular group of information bits.

Each of the accumulators ACC1 through ACC3 may be arranged to operate with a different radix or modulus. For example, the accumulator ACC1 may be operating mod 9 without carry, the accumulator ACC2 may be operating mod 13 without carry, and the accumulator ACC3 may be operating mod 15 without carry.

After a selected number of frames have been transferred and the weights have been accumulated, the data in the respective accumulators ACC1 through ACC3 will be transferred out and applied to the channels CH1 through CH3 respectively.

In accordance with the teachings of the abovementioned Bloch patent, the data may be transferred to a utilization circuit and after such transfer, the information may again be passed through a circuit similar to that illustrated in FIGURE 1. The resultant numbers generated may then be compared with the numbers transferred with the data to determine if there has been an error. It will be apparent that if there is an error in the data transferred in channel CH1, the error will be indicated by the check numbers associated with the accumulators ACC1 and ACC3. In other words, should an error be indicated by way of the check numbers carried in channels 1 and 3, this will uniquely identify the fact that an error occurred in channel 1. If there should be an error indicated as a result of checking the check numbers in channels 2 and 1, this will uniquely identify the fact that an error occurred in channel 2. Similarly, should there be an error indicated by way of the check numbers in channels 2 and 3, this will uniquely identify the fact that the error resulted in channel 3.

In considering the operation of FIGURE 1 in greater detail, assume first that channel CH1 has a series of six "ones" appearing in time sequence and that channels CH2 and CH3 have a series of six "zeroes" appearing in the corresponding time sequence. Assume further that the "ones" are required to activate the gate input to the accumulators ACC.

The steps of operation for the circuit may be tabulated in the following manner with the "ones" from channel CH1 acting on the accumulators ACC1 and ACC3.

*Table IV*

| Bit Pos. | WG1 | ACC1 | WG3 | ACC3 |
|---|---|---|---|---|
| 1 | 000001— 1 | 1 | 000001— 1 | 1 |
| 2 | 000010— 2 | 3 | 000010— 2 | 3 |
| 3 | 000100— 4 | 7 | 000100— 4 | 7 |
| 4 | 001000— 8 | 6 | 001000— 8 | 0 |
| 5 | 010000—16 | 4 | 001001— 9 | 9 |
| 6 | 100000—32 | 0 | 001010—10 | 4 |

At the end of such a data transfer, the number stored in ACC1 will be zero, while the number in ACC3 will be 4. If this were all the data to be processed, the contents of the accumulator may then be transferred to a utilization circuit. At the utilization circuit, the same type of apparatus may be used to create from the data transferred numbers corresponding to those in the accumulators ACC1 and ACC3. If the generated numbers agree with the check numbers transferred, there will be no error. However, if the numbers do not agree, there will be an error. This error will be indicated by a failure to check both of the check numbers, and since the numbers associated with channels 1 and 3 are involved, this will indicate an error in channel CH1.

The foregoing operational steps may be followed in a similar manner for various bit combinations in the three channels CH1, CH2, and CH3.

Figure 3:
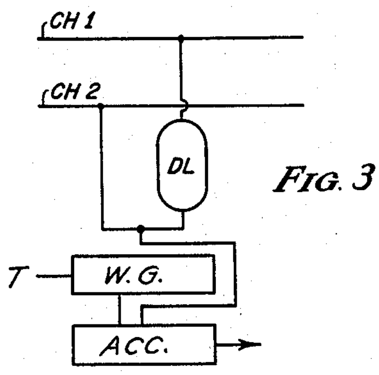
FIGURE 3 is a modification adapted for use with the circuitry of FIGURE 1.

The circuitry of FIGURE 3 illustrates another manner in which the data may couple the contents of the weight generator into the accumulator circuits. In this figure, instead of using an exclusive OR circuit as in FIGURE 1, the data from the two channels may be arranged to occur in a predetermined time sequence by inserting a delay line D in the connection to one of the channels. This will then insure that each pulse coming in will be applied to appropriately gate the weight generator output into the accumulator. The timing pulses T, in this instance, may be available to step the weight generator WG twice for every frame of information transferred. In other respects, the general operation of the circuitry will remain substantially the same as that discussed above in connection with FIGURE 1.

Figure 4:
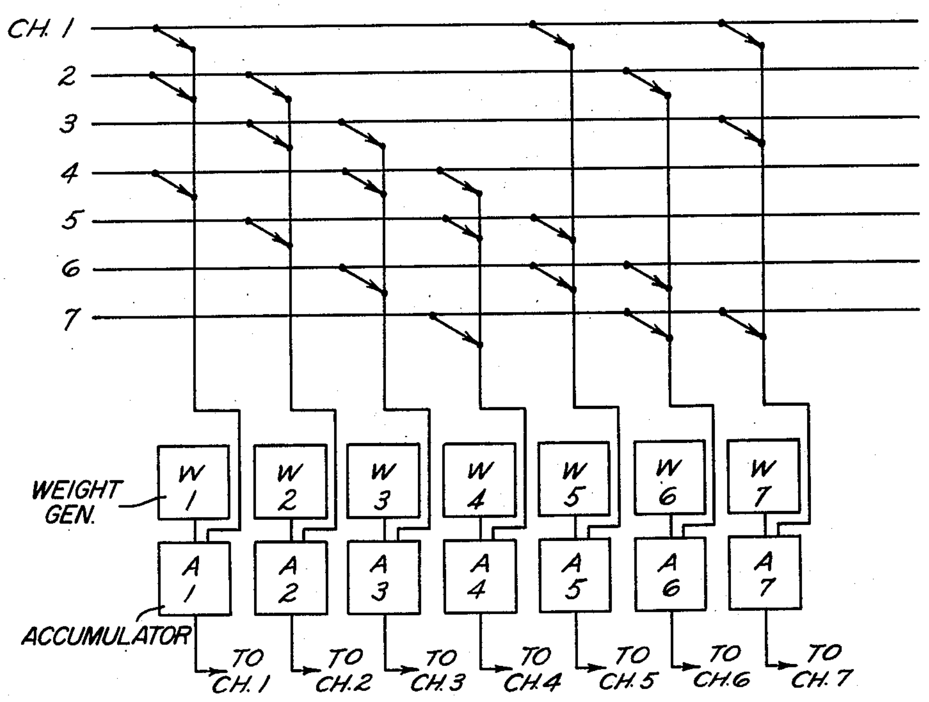
FIGURE 4 is a representation of how the principles of the invention may be extended to a larger number of channels.

FIGURE 4 illustrates one manner in which the principles of the invention may be applied to a seven-channel transfer circuit wherein the data from each channel will appear in the check number carried in three channels. In this figure there are seven channels, CH1 through CH7. Further, there are seven weight generators, W1 through W7. In addition, there are seven accumulators, A1 through A7. The data from channel 1 will be used in generating the check numbers associated with the accumulators A1, A5, and A7. The data from channel 2 will be used in generating the check numbers associated with the accumulators A1, A2, and A6. The data in channel 3 will be used in generating the data check numbers associated with the accumulators A2, A3, and A7. In a similar manner, each of the channels 4, 5, 6, and 7 will be associated with a unique combination of three accumulators.

With the scheme illustrated in FIGURE 4, the power of the checking numbers generated in the accumulators will further increase the ability of the system to check the accuracy of the data transferred. The uniqueness of the numbers created from any one particular transfer will now be the product of three numbers representing the periods of the respective weight generators associated with that particular channel. Thus, as far as channel 1 is concerned, the periods of the weight generators W1, W5, and W7 are used in establishing the uniqueness of the weight of the assignments of the data from channel 1. By selecting the weights of the generators so that their periods of repetition are all relatively prime, as pointed out above with respect to FIGURE 1, the check number may be made to encompass a very large number of frames without any danger of any repetition.

It will be apparent that in the receiving apparatus, constructed as shown in FIGURE 4, if an error should be indicated in the check numbers associated with channels 1, 5, and 7, the resultant errors indicated will define the fact that the error occurred in channel 1. If the check numbers associated with channels 4, 6, and 7 indicated an error, this would define the fact that an error occurred in channel 7, inasmuch as the channel 7 data was used in deriving the numbers associated with the check numbers carried in the channels 4, 6, and 7. It is further to be noted that the identification of the channel in error is unique, even for two errors separated by the period of one of the generators W1–W7.

It will be apparent that the principles set forth in FIGURES 1 and 4 may be extended to any number of channels with the power of the checking being a factor dependent upon the number of check numbers used to carry information relating to any particular channel. Thus, in any transfer circuit having $n$ channels, there will be provided $n$ check number generating circuits which are connected to $k$ of the $n$ number generating circuits where $k$ is more than one and less than $n$.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. Apparatus for generating checking data for a multiple channel data processing circuit for manipulating a plurality of data bits comprising a plurality of data transfer circuits adapted to operate simultaneously, a plurality of checking number accumulating circuits, means connecting each of said data transfer circuits to a separate selected pair of said number accumulating circuits and the input of each of said accumulating circuits to a different pair of data transfer circuits so that each signal representation of the data from each data transfer circuit will be used to control the generation of a check number in the two number accumulating circuits connected thereto and each number generated by each accumulating circuit will be in accordance with the input from at least two of said transfer circuits, and timing means connected to said accumulating circuits to transfer the numbers therein to said transfer circuits after the data has been transferred.

2. Apparatus for use with a data processor comprising a data manipulating circuit having a plurality of channels adapted to manipulate data at the same time, a plurality of check number generating circuits, and means including exclusive OR circuitry simultaneously connecting each of said plurality of channels to at least two of said number generating circuits so that said generating circuits produce a check number from the data in at least two channels as transferred by said exclusive OR circuitry.

3. Apparatus for use with a data processor comprising a data manipulating circuit having a plurality of channels adapted to manipulate data at the same time, a plurality of check number generating circuits, means connecting each of said plurality of channels to at least two of said number generating circuits and the input of each of said accumulating circuits to a different pair of data transfer circuits so that said generating circuits produce a check number from the data in at least two channels and each number generated by each accumulating circuit will be in accordance with the input from at least two of said transfer circuits, and time-controlled gating means connecting said generating circuits to said channels to transfer the check numbers therein to said channels after said data has been manipulated.

4. Apparatus for a data processor comprising an *n* channel data processing circuit, said *n* channels being adapted to process data at the same time, *n* data check number generating circuits, means connecting each of said *n* channels to precisely *k* of said *n* number generating circuits where *k* is more than one and less than *n*, and means connecting each of said *n* number generating circuits to more than one but less than *n* of said channels.

5. Apparatus for a data processor comprising an *n* channel data processing circuit, *n* data check number generating circuits, each of said check number generating circuits operating according to a particular modulus which is prime with respect to the other generating circuits, means connecting each of said *n* channels to precisely *k* of said *n* number generating circuits where *k* is more than one and less than *n*, and means connecting each of said *n* number generating circuits to more than one but less than *n* of said channels.

6. Apparatus for a data processor comprising an *n* channel data processing circuit, *n* weighted number generating circuits, *n* accumulators connected one each to each of said *n* generating circuits, means connecting each of said *n* channels to precisely *k* of said *n* number generating circuits where *k* is more than one and less than *n*, and means connecting each of said *n* number generating circuits to more than one but less than *n* of said channels.

7. Apparatus as defined in claim 6 wherein each of said *n* accumulators is operating according to a particular modulus which is prime with respect to each of the other accumulators.

8. Apparatus for producing check numbers for a data processor comprising a plurality of data processing channels adapted to transfer a plurality of bits at the same time to form a frame of data, a plurality of weight generating circuits, a plurality of weight accumulating circuits, means shifting said weight generating circuits for each frame of data on said channels, means including data from each channel for gating the contents of two weight generating circuits into two weight accumulating circuits, and means connecting each of said weight accumulating circuits to at least two different channels.

9. Apparatus for producing check numbers for a data processor comprising a plurality of data processing channels, a plurality of weight generating circuits, each comprising a multi-bit repetitive counter having a different period of repetition from any other counter in said weight generating circuits, a plurality of weight accumulating circuits, means shifting the count of said weight generating circuits for each frame of data transferred on said channels, means including data from each channel for gating the contents of two weight generating circuits into two weight accumulating circuits, and means connecting each of said accumulating circuits to at least two of said channels.

10. Apparatus according to claim 9 wherein said weight generating circuits have different periods of repetition which are relatively prime with respect to each other.

11. Apparatus according to claim 10 wherein each of said weight accumulating circuits are each operating in accordance with a radix which is different than the radix of any other one of said weight accumulating circuits.

References Cited in the file of this patent

UNITED STATES PATENTS

| | | |
|---|---|---|
| Re. 23,601 | Hamming | Dec. 23, 1953 |
| Re. 24,447 | Bloch | Mar. 25, 1958 |
| 2,281,745 | Buckingham | May 5, 1942 |
| 2,626,751 | Mullarkey | Jan. 27, 1953 |
| 2,758,787 | Felker | Aug. 14, 1956 |
| 2,881,976 | Greanlas | Apr. 14, 1959 |
| 2,977,047 | Bloch | Mar. 28, 1961 |

OTHER REFERENCES

Arithmetic Operations in Digital Computers, by R. K. Richards, Van Nostrand Co., 1955, pp. 187–190 relied on.